United States Patent

[11] 3,599,205

[72] Inventors Hendrik Cornelis Anthony Van Duuren Wassenaar;
Herman Da Silva, Voorburg, both of, Netherlands
[21] Appl No. 756,020
[22] Filed Aug. 28, 1968
[45] Patented Aug. 10, 1971
[73] Assignee De Staat Der Netherlands, Ten Deze Vertegenwoordigd Door De Directeur-Generaal Der Posterijen, Telegrafie En Tetefonie
[32] Priority Sept. 4, 1967
[33] Netherlands
[31] 6712110

[54] BINARY TO TERNARY PROTECTED CODE CONVERTER
10 Claims, 5 Drawing Figs.

[52] U.S. Cl. 340/347 DD, 178/26 R, 325/38 A
[51] Int. Cl. H04l 3/00, G06f 5/00, H03k 13/24
[50] Field of Search 340/347; 178/26; 325/38

[56] References Cited
UNITED STATES PATENTS

| | | | |
|---|---|---|---|
| 2,459,904 | 1/1949 | Watson | 178/26 |
| 2,603,705 | 7/1952 | Van Duuren | 178/26 X |
| 2,709,199 | 5/1955 | Van Duuren | 178/26 X |
| 3,005,871 | 11/1961 | Rudolph | 178/26 |
| 3,418,631 | 12/1968 | Sipress et al. | 340/347 X |
| 3,505,644 | 4/1970 | Breant | 340/347 X |

*Primary Examiner*—Maynard R. Wilbur
*Assistant Examiner*—Michael K. Wolensky
*Attorney*—Hugh Adam Kirk ABSTRACT: A first code converter comprising two shift registers, one with a counter, and a logic circuit for converting binary code signals having a specified number of bits into protected code signals preferably having the same number of bits and preferably exhibiting a specified 0-bit/1-bit ratio, and a second code converter comprising a counter, a feedback shift register, and two keying devices for converting the 1-bits for transmission at two levels, such as potentials, amplitudes, or frequencies, different from the level at which the 0-bits are transmitted, to form a ternary code with the number of 1-bits transmitted at one level and the number of 1-bits transmitted at the other level exhibiting a constant ratio.

| TRIGGERS P Q | FIRST TWO 1-BITS | LAST TWO 1-BITS |
|---|---|---|
| 0 0 | - - | + + |
| 1 0 | + - | - + |
| 0 1 | - + | + - |
| 1 1 | + + | - - |

FIG. 1a TABLE 1

| TRIGGERS = | Q | P | Q | P | Q | P | Q | P |
|---|---|---|---|---|---|---|---|---|
| PULSES Pzp1 | 0 | 0 | 1 | 0 | 0 | 1 | 1 | 1 |
| Pzp2 | 1 | 0 | 1 | 1 | 0 | 0 | 0 | 1 |
| Pzp3 | 1 | 1 | 0 | 1 | 1 | 0 | 0 | 0 |
| Pzp4 | 0 | 1 | 0 | 0 | 1 | 1 | 1 | 0 |

FIG. 1b TABLE 2

INVENTOR.
H. C. A. VAN DUUREN
BY Hugh A. Kirk
ATTORNEY

INVENTOR.
H. C. A. VAN DUUREN

BY Hugh A Kirk
ATTORNEY

BINARY TO TERNARY PROTECTED CODE CONVERTER

BACKGROUND OF THE INVENTION

The invention relates to a system for converting nonprotected code signals having a specified number of bits into protected code signals, preferably having the same number of bits and preferably exhibiting a specified 0-bit/1-bit ratio.

Such systems are common knowledge. Well known e.g. is a system in which 5-bit-code signals are converted into 7bit-code signals having a constant 0-bit/1-bit ratio. The signals are transmitted at two levels, the 0-bits being transmitted e.g. at zero polarity and the 1-bits at plus polarity, or the 0-bits being transmitted e.g. at plus polarity and the 1-bits at minus polarity. These different polarities can be converted into different frequencies.

A code thus formed allows a specified number of combinations (signals). In the case of a five-unit code of signals having four 1-bits and three 0-bits this number of combinations is (7!/3!4!)=35. If more combinations are wanted the number of bits in each signal has to be increased.

SUMMARY OF THE INVENTION

It is the object of the invention to increase the number of possible combinations by such a conversion that the number of bits per signal remains unchanged and the number of levels at which transmission takes place is increased. According to the invention this object is attained in such a manner that the 1-bits are converted before being transmitted and that they are transmitted at two levels, such as potentials, amplitudes or frequencies, different from the level at which the 0-bits are transmitted, the number of 1-bits transmitted at one level and the number of 1-bits transmitted at the other level exhibiting a constant ratio. If in a code of which a signal consists of three 0-bits and four 1-bits, two 1bits are transmitted at one level and the remaining two 1-bits at another level, the two levels differing from the level at which the 0-bits are transmitted, there will be formed a ternary code with (7!/3!2!2!)=210 possible combinations.

By the system according to the invention it is achieved that the number of possible combinations is increased without increasing the number of bits of the signals. Further the protection of the signals is improved because besides the check on the 0-bit/1-bit ratio = three-fourths, a check on the 2/2 ratio of the 1-bits can be carried out. Further, by choosing an even ratio for the two 1-bit levels, the DC component can be suppressed.

BRIEF DESCRIPTION OF THE VIEWS

The above-mentioned and other features, objects, and advantages, and the manner of attaining them are described more specifically below by reference to an embodiment of this invention shown in the accompanying drawings, wherein:

FIG. 1 is a schematic block wiring diagram of one embodiment of a binary to ternary code converter according to this invention;

FIGS. 1*a* and 1*b* are of Tables 1 and 2, respectively, of the operation of the triggers in the part *Co* 2 shown in FIG. 1;

FIG. 2 is a more detailed block wiring diagram of the constant ratio 1 to 0-bit code converter part *Co* 1 shown in FIG. 1; and FIG. 3 is a wave form diagram of the conversion control pulses employed in the circuit of FIG. 2.

DETAILED DESCRIPTION OF A PREFERRED EMBODIMENT

Figure 1:
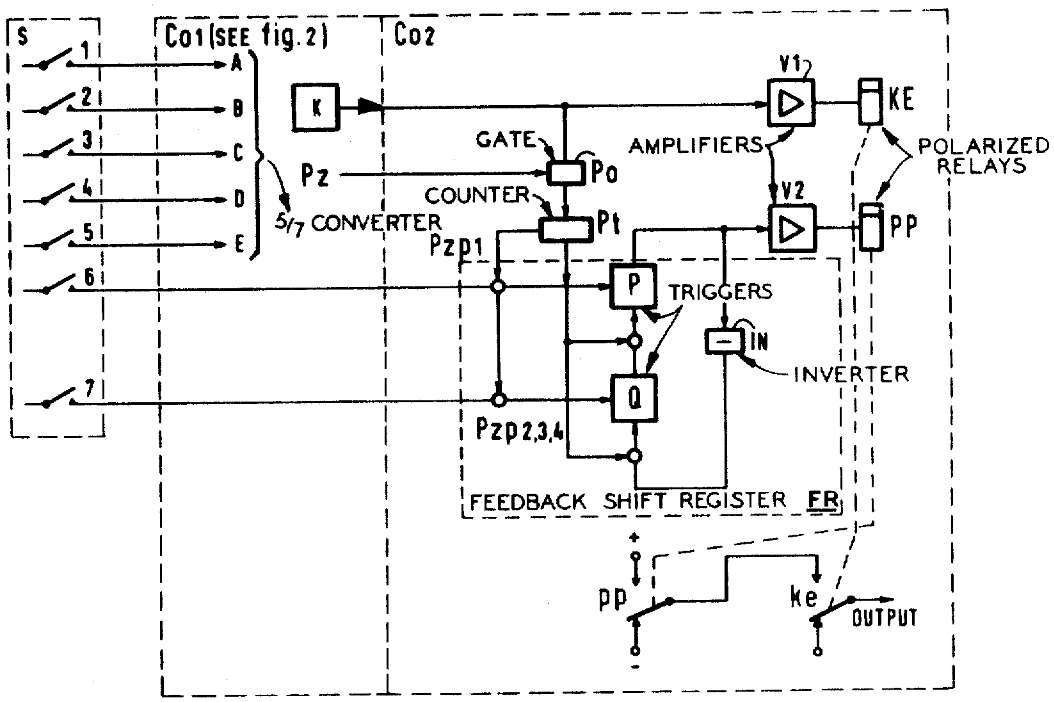

In FIG. 1, block S represents the source of information from which the original 7-bit signal is drawn. By temporarily closing the contacts 1 through 7, polarities corresponding to the applied bits are passed to the converter. The first 5 bits of a 7-bit signal go to the first part *Co* 1 of the converter, where they are converted into 7 bits, of which three are 0-bits and four are 1-bits. The 7-bit signal thus formed leaves the first part of the converter via the device designated by K, from where the bits are led sequentially via an amplifier V1 to a polarized relay KE.

Further the bits of a signal formed in *Co* 1 are applied to a gate circuit *Po* in the second part *Co* 2 of the code converter, which gate lets pass the pulse pz from the pulse generator in the *Co* 1 part when a 1-bit is applied to it by the device K. The Pz pulses thus passed on by the gate circuits *Po* control a counter *Pt*, which, at the first 1-bit occurring in a signal, records the bits 6 and 7 of the original 7-bit signal in the triggers P and Q by means of the pulse P*zp*1. The triggers P and Q, together with the inverting circuit IN, form a feedback shift register FR, which is controlled by the pulses P*zp*2 P*zp*3, and P*zp*4, which the counter *Pt* passes on when the second, third, and fourth 1-bits occur respectively. The potentials of the last 2 bits 6 and 7 of the original 7-bit signal can present one of the combinations 00, 10, 01 or 11. These combinations determine how the four 1-bits in the 7-bit signal formed in converter part *Co* 1 will be transmitted (see Table 1 in FIG. 1*a*). If both triggers P and Q are in the 0-position, the first and second 1-bits will be transmitted at minus polarity and the third and fourth at plus polarity. If the P and Q positions present the combination 1 and 0, the first and second 1-bits will be transmitted at plus and minus polarity, respectively, the third and fourth 1-bits being transmitted at minus and plus polarity, respectively. If P and Q are in the positions 0 and 1, respectively, the first and second 1-bits will be transmitted at minus and plus polarity, respectively, the third and fourth 1-bits being transmitted at plus and minus polarity, respectively. If both P and Q are in the 1-position, the first and second 1-bits are transmitted at plus polarity and the third and fourth 1-bits are transmitted at minus polarity. Thus, the polarities of the former two 1-bits are always the inverse of those of the latter two.

Table 2 (see FIG. 1*b*) indicates for each of the four possible combinations of the last 2 bits of the original signal, 00, 10, 01 or 11, the four combinations of states of the triggers P and Q in the feedback shift register FR occurring successively when the four 1-bits of the signal formed in the part *Co* 1 of the code converter appear at the output terminal of the trigger K. Thus e.g. in the code converter part *Co* 1, the 7-bit signal 1010010 is converted into the 7-bit signal 1010011, as determined by the first 5 bits of the original signal (see FIG. 2 described below), and the last 2 bits, 10, of this original signal determine the polarities at which the 1-bits of the converted signal will be transmitted. Thus the relevant signal is transmitted as a ternary code signal as follows: +0—00—+.

Figure 2:
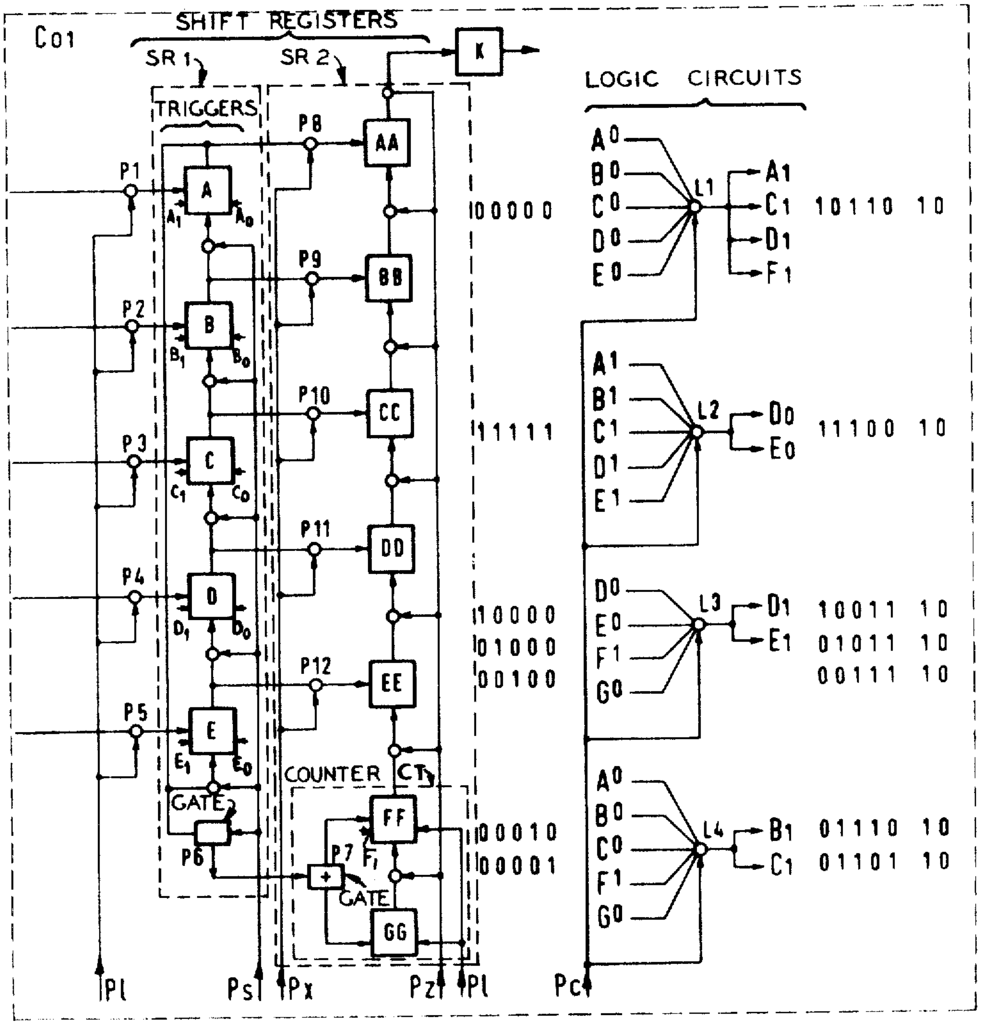
Figure 3:
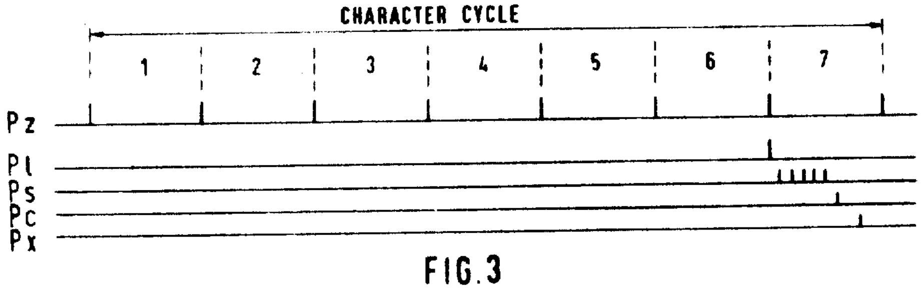

FIG. 2 shows details of the first part *Co* 1 of the converter according to FIG. 1. By temporarily closing the contacts 1 through 5 in the source of information S in FIG. 1, the first 5 bits of the 7-bit signal are recorded in the triggers A through E in FIG. 2, respectively. This is done under the control of a device which supplies the pulses as shown in FIG. 3. A character cycle consists of seven periods, as indicated on the line Pz and the other pulses appear in the seventh period. The pulse P1 opens the gates P1 through P5, so that the 5 bits are transferred to and recorded in the five triggers A through E. These five triggers A—E form a first shift register SR 1, the input terminal of which is connected to the output terminal. By means of the five pulses P*s* the bits contained in this register SR 1 are shifted around, so that after five pulses P*s* each trigger A—E contains the same information as before the shifting process. At the same time, during this shifting process, the 1-bits contained in the shift register are led to a counter C*t* comprising the triggers FF and AA; the gate circuit P6 passes the 1-bits (1-potentials) to the gate circuit P7, which passes the first 1-bit to the trigger FF, the second to the trigger GG, and so on back and forth. If there are zero, one, two, three, four or five 1-bits, the counter comprising the triggers FF and GG assume the counting positions 00, 10, 11, 01, 00 and 10, respectively. The triggers FF and GG form part of a second shift register SR 2 further including the triggers AA through EE. At a later instant the bits contained in the triggers A through E are transferred to the triggers AA through EE via the gate circuits P8 through P12, controlled by the pulse $Px$.

For the greater part of the 5-bit signals (25 out of 32) the seven triggers AA to GG take positions corresponding to a 7-bit signal having four 1 bits and three 0-bits, since for the 10 signals having two 1-bits in the 5-bit code, the triggers FF and GG take the counting position 11, thus completing the total of four 1-bits. Further, for the 10 signals having three 1-bits in the 5-bit code the triggers FF and GG take the counting position 01, so that there are four 1-bits again. For the five signals having four 1-bits in the 5bit code the triggers FF and GG take the counting position 00, so that the number of 1-bits remains four. So 25 signals having the correct 1-bit/0-bit ratio can be formed already.

For seven signals, namely one signal having zero 1-bits, five signals having one 1-bit, and one signal having five 1-bits, measures must be taken to achieve a further conversion. Therefore, before the $Px$-pulse appears these 5-bit signals are converted into 5-bit signals having three 1-bits by means of the logic circuits L1 through L4. In these circuits $A^o$ represents an output terminal of the trigger A, notably the terminal having the 1-potential when the trigger is in the 0-state; $A'$ represents the trigger A terminal having the 1-potential when the trigger is in the 1-state. Further $A_o$ represents the input terminal via which the A-trigger is put in the 0-state, $A_1$ representing the input terminal via which it is put in the 1-state. The 5-bit signals indicated before the relevant logic circuits are converted into the 5-bit signals indicated behind these circuits in the first shift register at the moment when the $Pc$-pulse appears (i.e. before the $Px$-pulse). After that, when the $Px$-pulse appears, the signal thus converted is transferred to the corresponding triggers AA through EE in the second shift register SR2. Thus six of the seven exceptional signals of the five-unit code are recorded in the shift register triggers in the desired form, having four 1-bits and three 0-bits, since the signals having originally one or five 1-bits have three 1-bits now and the counter FF through GG is in the counting position 10, so that in these signals too there are four 1-bits and three 0-bits. Only the signal originally having zero 1-bits would get three 1-bits, because the counter would take the position 00; when the $Pc$-pulse appears, however, this counting position is changed into 10; see F1 in the logic circuit L1. Thus in the seven exceptional cases the suffix is always changed into 10 in order to mark the exceptional condition. The signals thus marked then get a special treatment at the receiving end too. By means of the P2-pulses a 7-bit signal thus converted is shifted sequentially to the device K, which is connected to the transmitter.

Now taking this original bit signal 1010010 as an example, the potentials corresponding to the 7 bits of this signal are applied to the contacts 1 to 7 in FIG. 1. The first 5 bits determine the conversion to the 7 bits by means of the binary code converter part or device *Co* 1, which as a result delivers the seven sequential constant ratio 1 to 0 bits 1010011 via the device K. The corresponding polarities are used for keying the relay KE. When the first bit, a 1-bit, is delivered by K, the KE-relay is energized; the contact *ke* is changed over. The positions of the triggers P and Q (see third QP column in Table 2 of FIG. 1*b*) present the combination 10, as determined by the last 2 bits (10) of the original signal. The trigger P being in the 1-position, the relay PP is energized; the *pp*-contact is changed over, so that the polarity of the first bit transmitted is plus. When the second bit, a 0-bit, appears, the KE-relay is not energized, the contact *ke* remains in the position shown and the second bit will be transmitted at zero polarity. When the third bit, a 1-bit, appears, the KE-relay is energized and changes over the *ke*-contact. The triggers in the shift register pass from the positions 10 to the positions 00 and since the trigger P is in the zero position the PP relay is not energized, so that, the contact *PP* being in the position shown, the third bit transmitted has minus polarity. When the fourth bit, a 0-bit, appears, the KE-relay is not energized, the contact *ke* is in the position shown and the fourth bit is transmitted at zero potential. When the fifth bit, a 0-bit, appears, this bit too is transmitted at zero potential. When the sixth bit, a 1-bit appears, the KE-relay is energized and changes over its contact *ke*. The shift register passes from the positions 00 to the positions 01. Consequently, the trigger P is in the 0-position, so that the PP-relay is not energized, the contact *pp* is in the position shown and the sixth bit is transmitted at minus potential. When the seventh bit, a 1-bit, appears, the KE-relay is energized the contact *ke* is changed over. The shift register passes from the positions 01 to the positions 11, so that the P-trigger is in the 1-position, the PP-relay is energized, the contact *pp* is changed over and the seventh bit is transmitted at plus potential. Thus the signal is converted into a ternary code signal and is transmitted as follows: +0−00−+. Consequently, a signal thus formed has three levels, which can be converted into three frequencies, a specified level being transmitted by a specified frequency.

The same method for forming a three-level or ternary code can be followed in converting an 8-bit code into an 8-bit three-level constant-ratio code. The first 6 bits of the original 8-bit code are converted, by the rules given, into an 8-bit code having a constant 0-bit/1-bit ratio of e.g. 4/4. In this case too, the last 2 bits of the original 8-bit signal can exhibit one of the four combinations 00, 10, 01 or 11, in accordance with which, by the means indicated in the second part *Co* 2 of FIG. 1, the polarities of the four 1-bits to be transmitted are determined.

While there is described above the principles of this invention in connection with specific apparatus, it is to be clearly understood that this description is made only by way of example and not as a limitation to the scope of this invention.

We claim:

1. A device for converting multielement first binary code signals into protected multielement ternary code signals of the same number of elements per signal comprising:

A. a first means for converting said first binary code signals into constant ratio binary code signals of two types of elements, and B. a second means for converting all of the elements of one of said two types of binary elements in each signal into a constant ratio of a second and a third type of elements to form a ternary code signal whose elements are transmitted at three different levels.

2. A device according to claim 1 wherein said first converting means converts a specified number of elements of said first binary code signals into said constant ratio binary code signals of the same number of elements as said ternary code.

3. A device according to claim 1 wherein said first converting means converts a specified number of elements of said first binary code signals into said constant ratio binary code signals of the same number of elements as said first binary code.

4. A device according to claim 1 wherein said first converting means comprises two parallel shift registers each having a plurality of triggers corresponding to the elements of the signals, and logic circuits connected to said triggers.

5. A device according to claim 4 wherein one of said shift registers includes as part thereof a counter circuit.

6. A device according to claim 1 wherein said second converting means comprises a counter circuit for said elements of said one type, a feedback shift register connected to and controlled by said counter circuit, and a pair of keying devices, one of which is connected to and controlled by said feedback shift register, and the other of which is controlled by said first converting means.

7. A device according to claim 6 wherein said keying devices include contacts which are connected in series.

8. A device according to claim 6 wherein said feedback shift register is shifted by the 1-bits from said first converting means.

9. A device according to claim 1 wherein said first converting means is for a specified number of elements of said first binary code signals, and said second converting means is controlled by the remaining elements of said first binary code signals.

10. A device according to claim 9 wherein said second converting means is controlled by said remaining elements of said first binary code signals.

PO-1050
(5/69)

UNITED STATES PATENT OFFICE
CERTIFICATE OF CORRECTION

Patent No. 3,599,205 Dated Aug. 10, 1971

Inventor(s) H.C.A. Van Duuren and Herman Da Silva

It is certified that error appears in the above-identified patent and that said Letters Patent are hereby corrected as shown below:

Column 2, line 7, "p2" should read -- Pz -- ; line 14, after "Pzp2" insert a -- , -- ; line 49, before "converter" insert -- code -- ; line 57, "P1" (first occurrence) should read -- Pz -- ; line 67, "AA" should read -- GG --. Column 3, line 13, after "four" insert a -- . -- ; line 47, "P2- pulses" should read -- Pz -pulses -- ; line 49, before "bit" insert -- seven- -- ; line 57, delete the "s" at the end of this line; line 71, "PP" should read -- pp -- .

Signed and sealed this 28th day of March 1972.

(SEAL)
Attest:

EDWARD M.FLETCHER,JR.
Attesting Officer

ROBERT GOTTSCHALK
Commissioner of Patents